United States Patent [19]

Krafft et al.

[11] Patent Number: 4,744,001
[45] Date of Patent: May 10, 1988

[54] CONTACT ARRANGEMENT FOR INSERTABLE POWER SWITCHES

[75] Inventors: Henning Krafft; Klaus Grahlmann, both of Neumünster, Fed. Rep. of Germany

[73] Assignee: Licentia Patent-Verwaltungs-GmbH, Frankfurt am Main, Fed. Rep. of Germany

[21] Appl. No.: 66,431

[22] Filed: Jun. 26, 1987

[30] Foreign Application Priority Data

Jun. 28, 1986 [DE] Fed. Rep. of Germany ....... 3621748
Jan. 26, 1987 [DE] Fed. Rep. of Germany ....... 3702199
Feb. 23, 1987 [DE] Fed. Rep. of Germany ....... 3705728

[51] Int. Cl.$^4$ .............................................. H02B 1/04
[52] U.S. Cl. .................................... 361/338; 361/342; 361/391; 361/429; 200/50 AA
[58] Field of Search ................................... 200/50 AA; 361/335–343, 391, 429; 307/112, 147

[56] References Cited

U.S. PATENT DOCUMENTS 4,136,374 1/1979 Posey .................................. 361/342

FOREIGN PATENT DOCUMENTS 1590231 4/1970 Fed. Rep. of Germany .

Primary Examiner—G. P. Tolin
Attorney, Agent, or Firm—Spencer & Frank

[57] ABSTRACT

A contact arrangement for connecting an insertable power switch to a switching system having a fixed carrier for supporting the power switch, the fixed carrier and the power switch each having respective connecting lugs, the power switch having an auxiliary circuit and being insertable into a predetermined position in the carrier, and the switching system including contact members for effecting an electrically conductive connection between the connecting lugs, and a drive mechanism for moving the contact members into predetermined contact positions. The contact arrangement further includes a contact frame which carries the contact members and is movable between OFF, TEST and ON operating positions, and a spindle drive which is fixed in the carrier below the location of the power switch; said contact frame is movable to positively connect the connecting lugs of the fixed system portion and the power switch in the TEST and ON positions when the power switch is in the predetermined position in the carrier, the contact arrangement further includes a plug-in contact which is positively moved together with the frame for providing electrical connections to the auxiliary circuit of the power switch; and the frame includes a cover plate which, in the various operating positions of the frame, positively assures a cover for the connecting lugs of the carrier to secure those lugs against contact by operating personnel and tools.

13 Claims, 5 Drawing Sheets

"OFF"

4,744,001

CONTACT ARRANGEMENT FOR INSERTABLE POWER SWITCHES

BACKGROUND OF THE INVENTION

The present invention relates to a contact arrangement for insertable power switches in switching systems, of the type including connecting lugs provided in a fixed system portion and at the power switch, the power switch being inserted into a fixed position, and contact bridges provided for the electrically conductive connection of fixed contact lugs with the contact lugs provided at the power switch, the contact bridges being brought into predetermined contact positions by way of a drive, FRG-OS No. 1,590,231 discloses a power switch for installation in switching systems. This switch is connected to bus bars in order to separate electrical connections by way of displaceable or vise-like foldable plug-in couplings. The plug-in couplings are mounted to an insulating wall and are displaceable together with that wall in the direction of the bus bar.

In the prior art contact arrangement, the power switch is disposed behind a partition through which the displacement of the plug-in couplings is effected by way of a dual-arm lever. The prior art contact arrangement has the drawback that, for replacement of the power switch, the lever drive at the front plate must be disassembled, the insulating wall receiving the plug-in couplings serves only to insulate the plug-in couplings from one another and provides no electrical insulation protection with respect to the fixedly installed, current-conducting system components, and installation of the contact arrangement is possible only in switching systems whose frontal partitions are suitable for this purpose.

SUMMARY OF THE INVENTION

It is an object of the present invention to provide a contact arrangement in which all electrical connections for TEST and ON operating positions can be made by means of one drive. The switch can be fixed in these operating positions and, in the OFF and TEST positions, all current-carrying parts are covered in a manner secure against human contact and tools.

The above and other objects are achieved, according to the present invention, in a contact arrangement for an insertable power switch in a switching system having a fixed system portion, the fixed system portion and the power switch each having respective connecting lugs, the power switch having an auxiliary circuit and being insertable into a predetermined position in the carrier, and the switching system including contact members for effecting an electrically conductive connection between the connecting lugs of the fixed system portion and the connecting lugs of the power switch, and drive means for moving the contact members into predetermined contact positions, by the improvement wherein: the contact arrangement comprises a contact frame which carries the contact members and is movable between OFF, TEST and ON operating positions, and a spindle drive which is fixed in the fixed system portion below the location of the power switch; the contact frame is movable to positively connect the connecting lugs of the fixed system portion and the power switch in the TEST and ON positions when the power switch is in the predetermined position in the carrier; the contact arrangement further includes a plug-in contact which is positively moved together with the contact frame for providing electrical connections to the auxiliary circuit of the power switch; and the contact frame includes a cover plate which, in the various operating positions of the frame, positively assures a cover for the connecting lugs of the fixed system portion to secure those lugs against contact by operating personel and tools.

The advantages of a contact arrangement according to the present invention are that the arrangement of the spindle drive below the power switch enables the switches to be exchanged without disassembly work, any desired frontal configurations are possible for the switches, the switch is positively fixed and the current-carrying system components are likewise positively protected against contact and tools when the switch is in the TEST and ON positions. A further advantage resides in the fact that the TEST position can also be set by way of the spindle drive.

The invention will now be described in greater detail with reference to an embodiment which is illustrated in the drawing figures.

DESCRIPTION OF THE PREFERRED EMBODIMENTS

Figure 1:
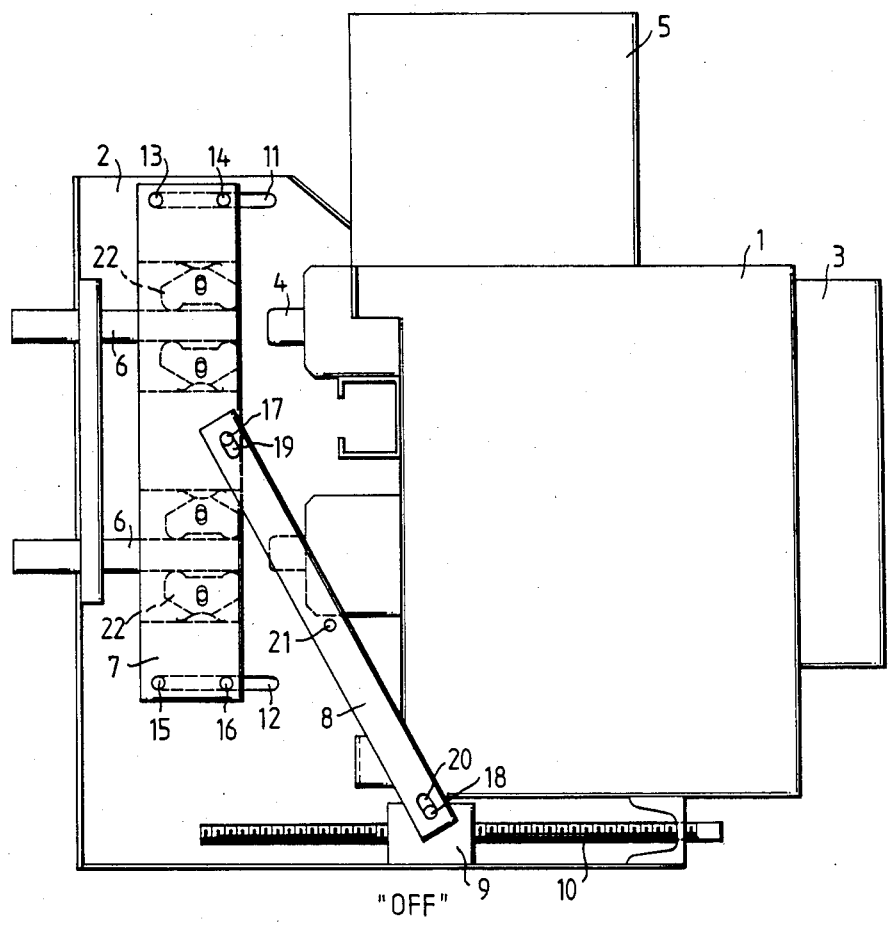
FIG. 1 is a side elevational view showing the switch in its OFF operating position.

FIG. 1 shows an insertable switch 1 which has has been pushed into an insertable carrier 2 up to a predetermined position. A drive tube 3 is disposed at the front side of switch 1 and connecting lugs 4 are disposed at the rear side of switch 1. An arc quenching chamber 5 is mounted at the top of switch 1.

Insertable carrier 2 is also provided with connecting lugs 6 which are fixed to bus bars (not shown). To electrically connect connecting lugs 4 with connecting lugs 6, a contact frame 7 is provided which is displaceable by means of a drive lever 8 which is driven by a spindle nut 9. A spindle 10 is rotated in a known manner from the front of the switching system in order to displace nut 9 and hence to pivot lever 8.

Contact frame 7 is displaced in a manner secure against tilting in that frame 7 carries pairs of pins 13, 14 and 15, 16 which are guided in slots 11 and 12 provided in carrier 2. Alternatively, frame 7 can be guided by way of pins 47, 48, shown if FIG. 4. Frame 7 and nut 9 carry pins 17 and 18, respectively which engage pivotally in respective elongated holes 19 and 20 in lever 8 and carrier 2 carries a pin 21 which engages pivotally in a bore proved in the central region of lever 8.

Contact frame 7 is provided with resilient laminar contacts 22 which, in the illustrated OFF position of the switch, rest on fixed contact lugs 6.

Figure 2:
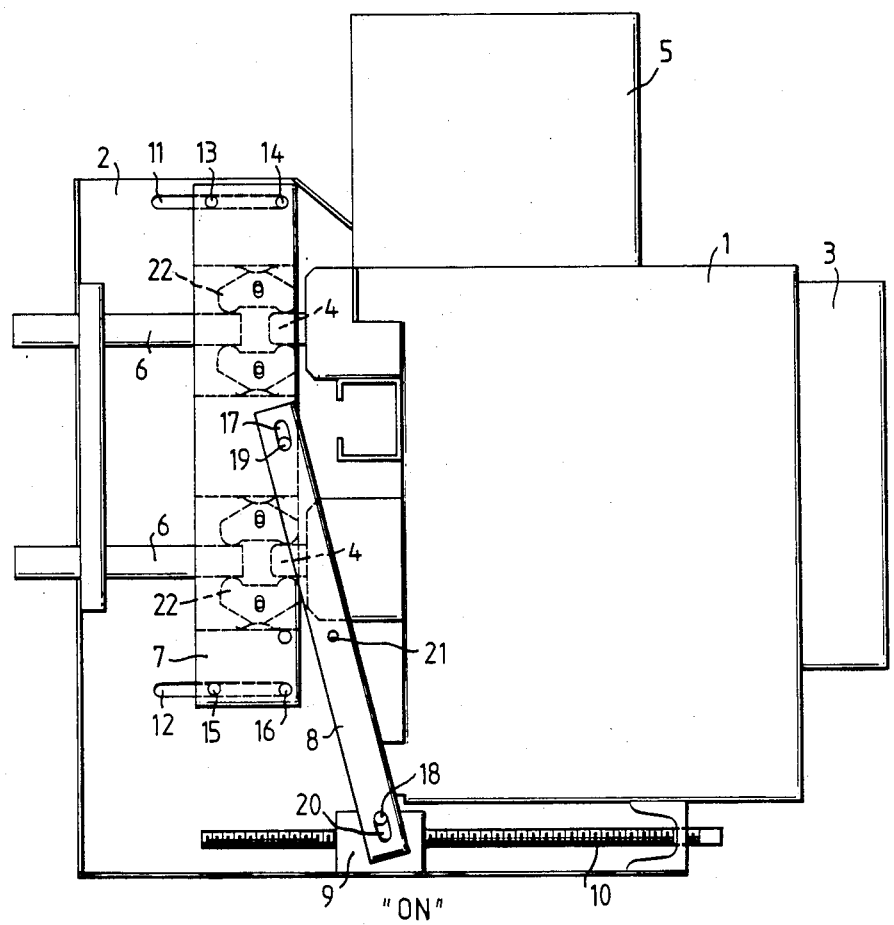
FIG. 2 is a view similar to that of FIG. 1 showing the switch in its ON operating position.

Actuation of spindle 10 to displace nut 9 to the left causes contact frame 7 together with laminar contacts 22 to move into the ON position shown in FIG. 2, with laminar contacts 22 connecting contact lugs 4 and 6 with one another.

Since spindle drive 10 is disposed in insertable carrier 2 in a position below contact switch 1, the problems known from the prior art and described above involving the arrangement of the lever drive at the frontal partition in front of the power switch are avoided. Moreover, the fact that contact frame 7 is guided in slots 11 and 12 at both sides of insertable carrier 2 results in separation of the electrical connection in a manner secure against tilting.

FIG. 2 shows the contact arrangement in the ON position of the power switch.

Figure 3:
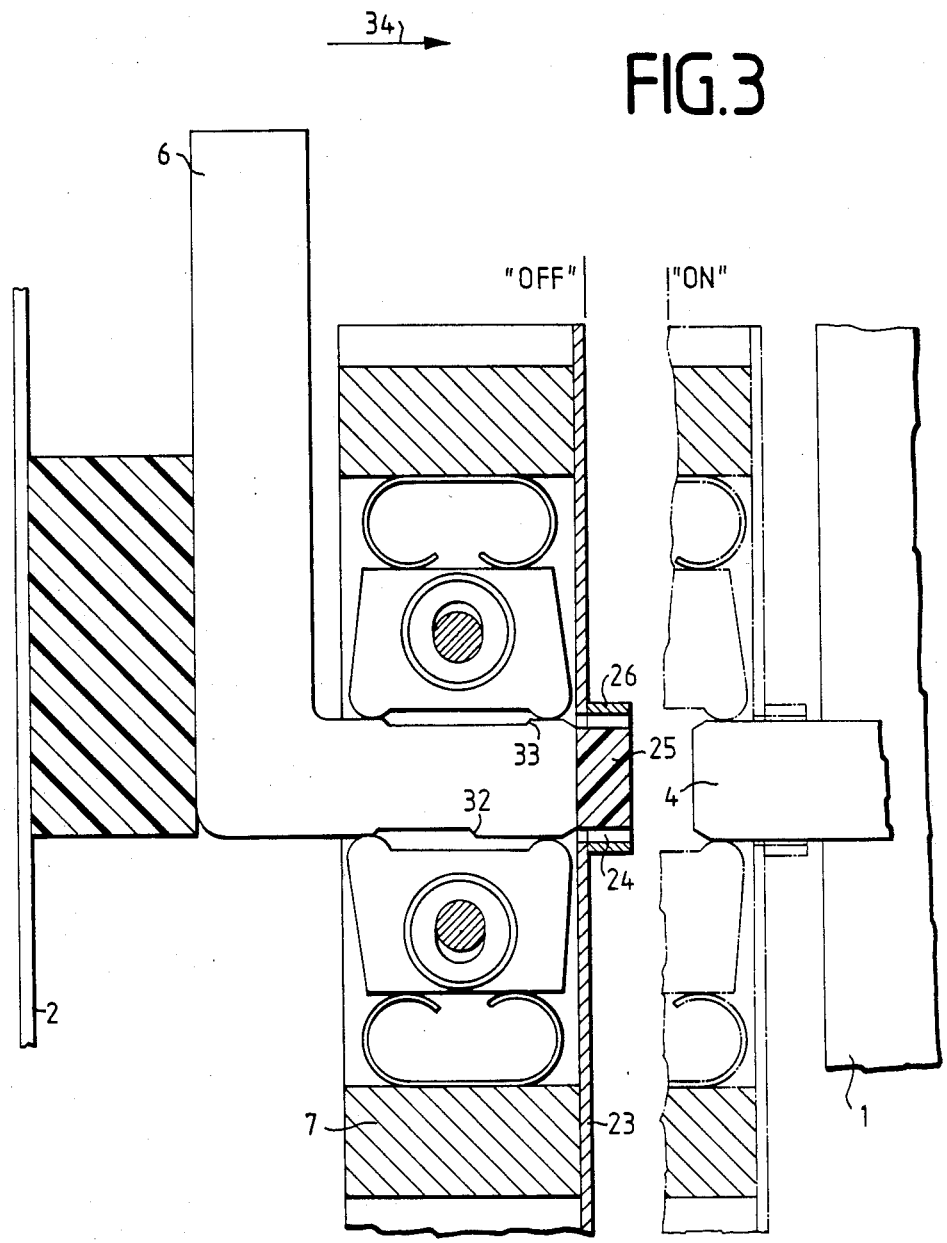
FIG. 3 is a cross-sectional detail view showing the insulation of the current-carrying system components in the OFF to ON positions of the switch of FIGS. 1 and 2.

FIG. 3 shows a particular form of construction in which a positively guided cover plate 23 is fastened to contact frame 7. This cover plate serves to electrically insulate the current-carrying system components. The frontal face of connecting lug 6 fastened to insertable carrier 2 is provided with an electrical insulating member 25 and may be surrounded with a projecting frame 26 in the region of a passage 24 for cover plate 23. This produces a covering for connecting lug 6 in the TEST to OFF positions which secures it against contact and tools. The configuration of contact frame 7 with cover plate 23 includes all connecting lugs 6 of an insertable carrier 2. FIG. 3 further shows connecting lug 6 having asymmetrical leading edges 32 and 33 which facilitate mutual sliding of oppositely disposed contact bridges 22 in a manner staggered in time when contact frame 7 is moved in the direction of arrow 34, to thus facilitate the sliding movement. Contact bridges are biassed toward lugs 4 and 6 by suitable springs.

FIG. 3 further shows, in broken lines, frame 7 and plate 23 in the ON position.

Figure 4:
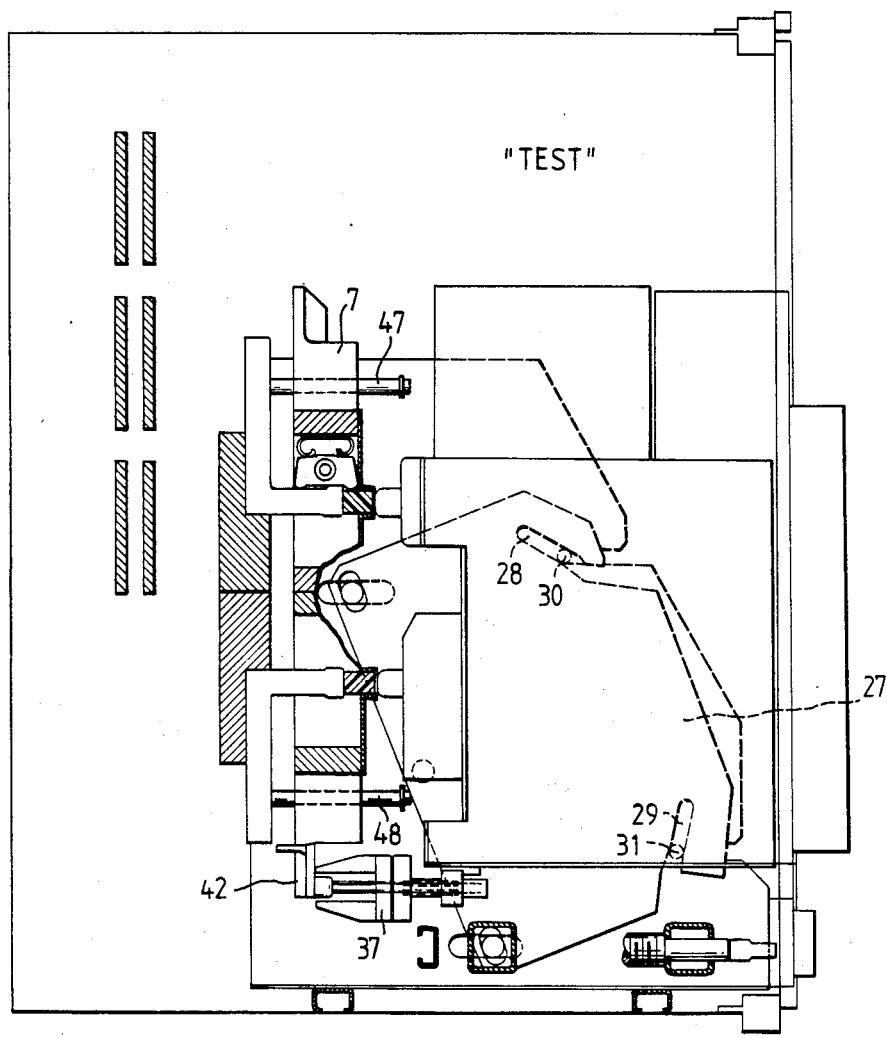
FIG. 4 side elevational view showing the fixing of the switch of FIGS. 1 and 2 in an insertable carrier for the TEST position.

FIG. 4 shows that, in order to fix the power switch in its TEST and ON positions, lever 8 shown in FIG. 1 has the configuration of a plate 27 which is provided with insertion slots 28, 29 in which pins 30, 31 of the power switch are guided. Moreover, the embodiment shown in FIG. 4 permits the guidance of the contact frame, in a manner secure against tilting, on pins 47, 48. FIG. 4 further shows the possible arrangement of a plug-in contact connection 37, 42 for the electrical connection of auxiliary circuits of power switch 1.

Figure 5:
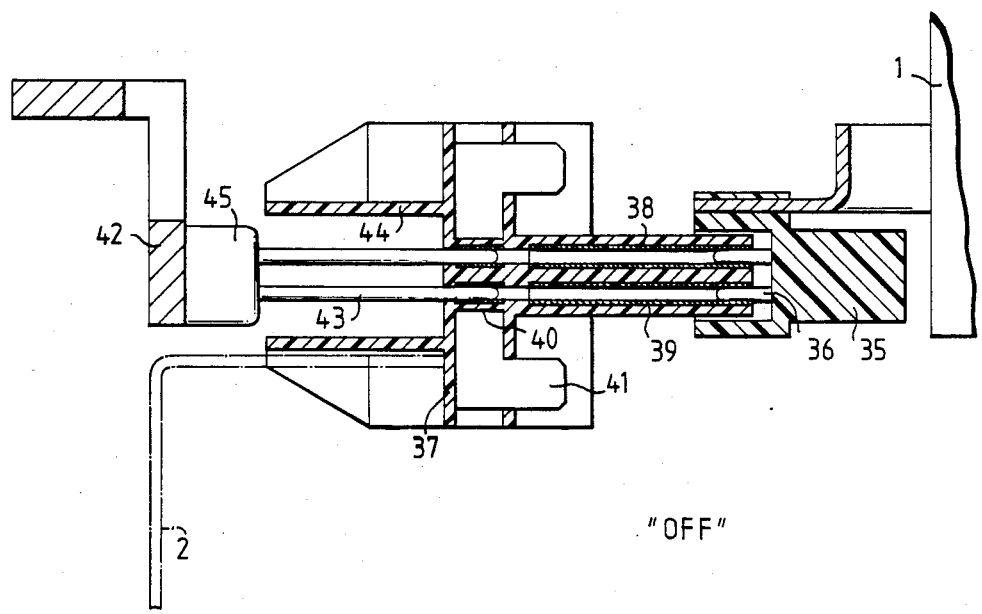
FIG. 5 is a detail view showing a plug-in contact device for auxiliary circuits, with the switch in the OFF position.

In FIG. 5 the plug-in contact connection for the electrical connection of the auxiliary circuits of the power switch is shown in the OFF position. The connection between contact plug 42 and contact frame 7, which may have any desired configuration, is not shown in FIG. 5. In the OFF position, contact pins 43 fastened to contact plug 42 are inserted in sleeves 40 of a sleeve strip 37 and, to set the TEST and ON positions, are positively inserted into contact sleeves 39 in the direction of movement arrow 46.

A plug housing 35 is fastened to power switch 1 and is provided with a plurality of plug-in pins 36 so as to electrically conductively connect the auxiliary circuits of switch 1 to the fixed system portion. Sleeve strip 37, aligned with plug housing 35, is fastened to insertable carrier 2 and is provided with one or a plurality of projections 38 which engage in plug housing 35 and which, in association with each one of the plug-in pins 36 are provided with pairs of mutually electrically insulated contact sleeves 39 and 40 disposed axially one behind the other, with contact sleeves 40 being oriented toward the insertable carrier and being provided with terminals 41 for wiring sleeves 40 to the stationary portion of the switching system. Electrically insulated insertable pins 43 correspond in number to the number of plug-in pins 36 and are disposed at insertable contact plug 42 which is moved together with contact frame 7, pins 36 and 43 being insertable into contact sleeves 39 and 40 so as to make contact in correspondence with the movement of contact plug 42. Sleeve strip 37 includes guide members 44 for components disposed at contact plug 42, e.g. for a receptacle 45 holding pins 43.

The invention now being fully described, it will be apparent to one of ordinary skill in the art that many changes and modifications can be made thereto without departing from the spirit or scope of the invention as set forth herein.

The present disclosure relates to the subject matter disclosed in German application No. P 36 21 748.4, the entire specification of which is incorporated herein by reference.

What is claimed:

1. In a contact arrangement for connecting an insertable power switch to a switching system having a fixed portion which includes a fixed carrier for supporting the power switch, the fixed system portion and the power switch each having respective connecting lugs, the power switch having an auxiliary circuit and being insertable into a predetermined position in the carrier, and the switching system including contact members for effecting an electrically conductive connection between the connecting lugs of the fixed system portion and the connecting lugs of the power switch, and drive means for moving the contact members into predetermined contact positions, the improvement wherein: said contact arrangement comprises a contact frame which carries said contact members and is movable between OFF, TEST and ON operating positions, and a spindle drive which is fixed in the fixed system portion below the location of the power switch; said contact frame is movable to positively connect the connecting lugs of the fixed system portion and the power switch in the TEST and ON positions when the power switch is in the predetermined position in the carrier; said contact arrangement further comprises a plug-in contact which is positively moved together with said contact frame for providing electrical connections to the auxiliary circuit of the power switch; and said contact frame comprises a cover plate which, in the various operating positions of said frame, positively assures a cover for the connecting lugs of the fixed system portion to secure those lugs against contact by operating personnel and tools.

2. Contact arrangement as defined in claim 1 wherein said carrier is provided with longitudinal slots for guiding said contact frame, said spindle drive includes a nut which is movable relative to said carrier, and said arrangement further includes a lever connected between said frame and said nut.

3. Contact arrangement as defined in claim 2 wherein the carrier includes a pivot pin, said lever is pivotally mounted, at the central region thereof, on said pivot pin, said carrier and said nut are each provided with a respective drive pin, said lever is provided at each of its ends with an elongated slot engaged by a respective one of said drive pins.

4. Contact arrangement as defined in claim 3 wherein said lever is configured as a plate which is mounted on said pivot pin and which is provided with insertion slots, and the power switch is provided with positioning pins which cooperate, in the TEST and ON positions, with said insertion slots to fix the power switch in the predetermined position on the carrier simultaneously with displacement of said contact frame.

5. Contact arrangement as defined in claim 2, wherein said connecting lugs of the fixed system portion have ends provided with asymmetrically configured leading edges.

6. Contact arrangement as defined in claim 2 wherein said contact frame comprises two guide pins each engaging in a respective longitudinal slot.

7. Contact arrangement as defined in claim 1 wherein said cover plate is provided with passages aligned with said connecting lugs of the fixed system portion, and said arrangement further comprises electrical insulating members which are fastened to the frontal end of said connecting lugs of the fixed system portion for filling the passages when said frame is in the TEST and OFF positions.

8. Contact arrangement as defined in claim 7 wherein said cover plate further comprises projecting frames surrounding said passages (24) in the cover plate (23) are surrounded by projecting frames (26) which, in the OFF and TEST positions, are filled with said electrical insulating members.

9. Contact arrangement as defined in claim 1 further comprising: a plug housing fastened to the power switch and provided with a plurality of plug-in pins so as to electrically conductively connect the auxiliary circuit to the fixed system portion; a strip of sleeves mounted on said carrier in alignment with said plug housing and provided with at least one projection which is engageable in said plug housing and which is provided with pairs of electrically insulated contact sleeves, with the sleeves of each pair being disposed axially one behind the other, one sleeve of each pair being engageable with a respective plug-in pin and the other sleeve of each pair being directed toward said carrier; terminals for wiring the other sleeve of each pair to the fixed system portion; and electrically insulated insertable pins, in a number corresponding to the number of plug-in pins, disposed at said plug-in contact for movement together with said contact frame, said insertable pins being insertable into said contact sleeves so as to make contact with said plug-in pins as a result of movement of said plug-in contact.

10. Contact arrangement as defined in claim 9 wherein said sleeve strip includes guide members for cooperating with a portion of said plug-in contact.

11. Contact arrangement as defined in claim 10 wherein said plug-in contact includes a receptacle for said insertable pins and said guide members are disposed to cooperate with said receptacle.

12. Contact arrangement as defined in claim 9, wherein, in the OFF, TEST and ON positions, said insertable pins are guided in said contact sleeves.

13. Contact arrangement as defined in claim 1 wherein said spindle drive includes a nut which is movable relative to the carrier, and further comprising horizontal pins mounted on the carrier for guiding said contact frame in a manner secure against tilting, and a drive lever connecting said frame to said nut.

* * * * *